United States Patent [19]

Takagi et al.

[11] Patent Number: 5,227,613
[45] Date of Patent: Jul. 13, 1993

[54] SECURE ENCRYPTED DATA COMMUNICATION SYSTEM HAVING PHYSICALLY SECURE IC CARDS AND SESSION KEY GENERATION BASED ON CARD IDENTIFYING INFORMATION

[75] Inventors: Nobuya Takagi, Neyagawa; Mamoru Ito, Nishinomiya; Toshio Tsuji, Matsubara, all of Japan

[73] Assignee: Matsushita Electric Industrial Co., Ltd., Kadoma, Japan

[21] Appl. No.: 582,172

[22] PCT Filed: Jan. 24, 1989

[86] PCT No.: PCT/JP90/00078
§ 371 Date: Nov. 20, 1990
§ 102(e) Date: Nov. 20, 1990

[87] PCT Pub. No.: WO90/09009
PCT Pub. Date: Aug. 9, 1990

[30] Foreign Application Priority Data

Jan. 24, 1989 [JP] Japan ..................... 1-15329
Jan. 24, 1989 [JP] Japan ..................... 1-15336

[51] Int. Cl.$^5$ ............................................. H04L 9/12
[52] U.S. Cl. ................................. 235/380; 235/382; 380/21; 380/44
[58] Field of Search ............ 235/380, 379, 382, 382.5; 380/4, 21, 23, 24, 28, 29, 30, 44

[56] References Cited

U.S. PATENT DOCUMENTS 4,227,253 10/1980 Ehrsam et al. ................... 380/25 X
4,649,233 3/1987 Bass et al. ........................ 380/21
4,809,327 2/1989 Shima ............................... 380/21 X
4,823,388 4/1989 Mizutani et al. ................. 380/23
4,961,142 10/1990 Elliott et al. .................... 235/380

FOREIGN PATENT DOCUMENTS

60-62252 4/1985 Japan .
62-189593 8/1987 Japan .
62-191991 8/1987 Japan .
63-50222 3/1988 Japan .
63-131169 6/1988 Japan .
63-219244 9/1988 Japan .

Primary Examiner—Davis L. Willis
Assistant Examiner—Edward H. Sikorski
Attorney, Agent, or Firm—Cushman, Darby & Cushman

[57] ABSTRACT

A secure encrypted data communication system between IC cards inserted in respective terminals. In order to encrypt plain text sent from a first terminal to a second terminal, a first IC card (51) receives a random number (r1) generated by a second IC card (52), and uses the number together with a secret key (ka) to generate a session key (ks1). The second IC card receives identification information (IDa) from the first IC card, and uses that information together with a master key (km) to obtain the secret key (ka), which is then used together with the random number to generate the same session key (ks1). Encryption of plain text sent from the second terminal to the first terminal can be done in a similar manner using a random number (r2) generated by the first IC card, and the identification information (IDb) of the second IC card.

1 Claim, 10 Drawing Sheets

PRIOR ART

SECURE ENCRYPTED DATA COMMUNICATION SYSTEM HAVING PHYSICALLY SECURE IC CARDS AND SESSION KEY GENERATION BASED ON CARD IDENTIFYING INFORMATION

TECHNICAL FIELD

The present invention relates to a data carrier such as an IC card which is usable for cipher communication, and a data communication apparatus using it.

BACKGROUND ART

Figure 11:
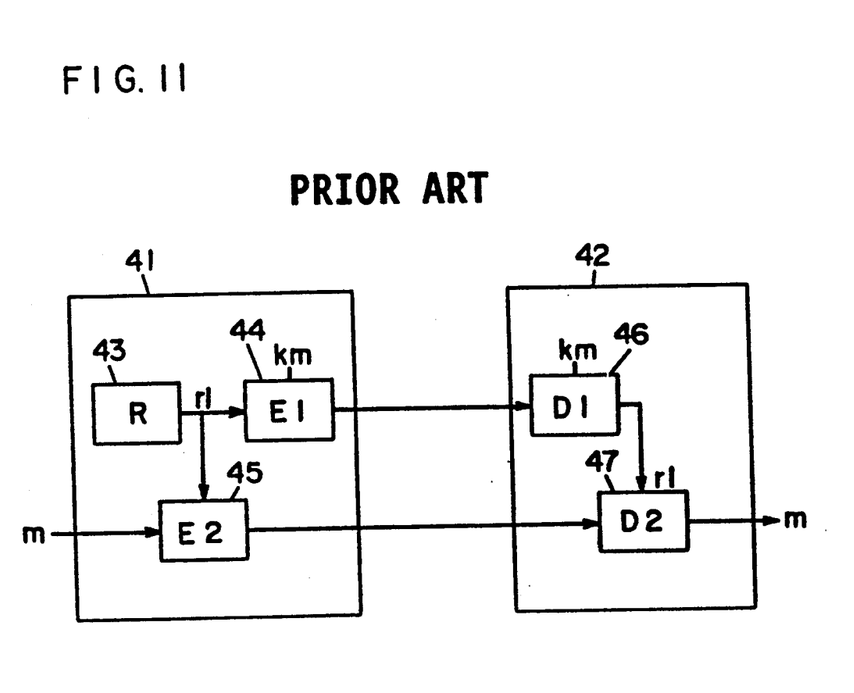
FIG. 11 is the figure of the system configuration showing the conventional key common ownership method.

In order to perform cipher communication in a secret key cipher system, both parties which make communication are required to hold in common a key in advance. Hitherto, sharing of the key has been performed by a system as shown in FIG. 11 for example. Referring to FIG. 11, numeral 41 designates a coder which is used by a sending party of a message (hereinafter is simply referred to as a sending party), and 42 designates a decoder which is used by a receiving party of the message (hereinafter is simply referred to as a receiving party), and the coder 41 comprises a random number generating means 43, a first enciphering means 44 and a second enciphering means 45, and the decoder 42 comprises a first decoding means 46 and a second decoding means 47.

Operation of the conventional common ownership system of the key composed like this is described hereafter. Since the key for enciphering a plain text of a message (hereinafter is simply referred to as a plain text) m is required to be changed frequently from the aspect of safety, a random number which is generated by the random number generating means 43 is used. Hereinafter, this is described as a session key. The sending party sends an output r1 (it is called a session key as another name) of the random number generating means 43 which is held in the coder 41 to the receiving party in order to hold in common with the receiving party; but if r1 is sent as the sate of raw data it is liable to be tapped on the communication line between the coder 41 and the decoder 42, and hence 41 is enciphered by the enciphering means 44 and is sent. The key which is used to encipher r1 is called as a master key km, and it is the key which is held in common by the sensing party and receiving party in advance. The master key is used only when the session key is sent by enciphering, and is generally fixed during a long time period. The decoder 42 of the receiving party decodes the enciphered random number by the master key km and restores r1 by using the first decoding means 46. Thereby, since the sending party and receiving party have held in common the session key r1, thereafter, cipher communication of the plain text m can be accomplished by the session key r1 by using the second enciphering means 45 and the second decoding means 47. In the event that the session key is changed, a new random number r2 (not shown) is generated by the random number generating means 43; and in the same manner as described above, r2 is held in common by the cipher communication by means of the master key km and is made to the session key.

Now, the case of cipher communication between two communication parties A and B is assumed. The communication party A and the communication party B encipher the session key r1 by using the master key km and send. When another communication party C holds the master key km, all cipher text which is exchanged between the communication parties A and B can be deciphered since the communication party C can decipher the session key r1. Therefore, it is required that the master key km is known by only the communication party A and the communication party B, and in the event that, for example, the communication party A carries out cipher communication with the communication party C, a master key which is other than km is used. Namely, the communication party A must hold the master keys which are identical with the number of the parties which carry out the cipher communication.

In such conventional system, there is no problem in the event of a small number of parties are to be communicated; but in a network having unspecified many subscribers, communication parties to be communicated become large number, and management of the key becomes a big problem. As a means for solving it, the method in which a center for performing management of the key is provided, and prior to prosecution of the cipher communication, the center delivers (or transmit) the common session key to both the parties, is generalized, but there is a defect that the center must intervene in every common holding operation of the key. On the other hand, as other solution, there is a method using the public key cipher system which is superior in management of the key, but the public key cipher system entails a much longer processing time in comparison with the secret key cipher system. As mentioned above, in the conventional cipher communication method, a big problem has existed with respect to the management of the key.

In view of such a problem, the present invention is directed to provide a data carrier which is safely, easily and speedy realizable common ownership of the key, on the basis of the futures in which an internal data is physically safety and calculation ability exist, and a data communication apparatus using it.

DISCLOSURE OF THE INVENTION

An in order to achieve the object, the data carrier of the present invention has a configuration comprising means for holding a first data which is impossible to be changed to data which is designated from outside, first enciphering means for enciphering the first data by a secret key, first decoding means for decoding a cipher text inputted from outside by said first data, second decoding means for decoding enciphered second data inputted from outside by the second secret key, and a second enciphering means for enciphering a plain text which is inputted from the outside or stored inside by the output of the above-mentioned second decoding means.

The feature of a configuration of the present invention is the point that the first secret key and the second secret key are stored in a memory in the IC card which is physically safe, and the point that a first data which is automatically generated by own IC card as a decoding key is used, and the key generated on the basis of a second data which is sent from the party is used for an enciphering key. Reason that the above-mentioned object is realized by this configuration can be elucidated as follows.

First, since the first secret key and the second secret key are stored in the memory in the IC card which is physically safe, these secret keys can not be read out even by the owner of the IC card. Therefore, without using the IC card which stores these secret keys, the first data and second data can not be restored from the output of the first enciphering means and the enciphered second data which are inputted from the outside. Consequently, the cipher text which is inputted from the outside and the cipher text which is output from the second enciphering means can not be deciphered.

If the second secret key is common to the whole IC cards, an evil-minded person can rebuild the second data in his own IC card by tapping the enciphered second data and inputting it into own IC card. However, the function that the IC card can performs by using the second data is only to encipher, and it has no decoding function. On the other hand, the key for decoding in this IC card is a first data which is automatically generated by own IC card. Namely, the evil-mined third person can not make setting of the decoding key and decoding using the key simultaneously.

From the above-mentioned matter, by the configuration of the IC card of the present invention, the IC card which has generated the first data, namely only the IC card of the receiving party can decode the cipher text, and the cipher communication is made safety. Furthermore, common ownership of the key is easily realized, by using the IC card of the present invention, since both the list of the secret key and the center are not required. Moreover, since it can be composed of only the secret key cipher, high speed processing is made possible.

BEST MODE FOR CARRYING OUT THE INVENTION

Figure 1:
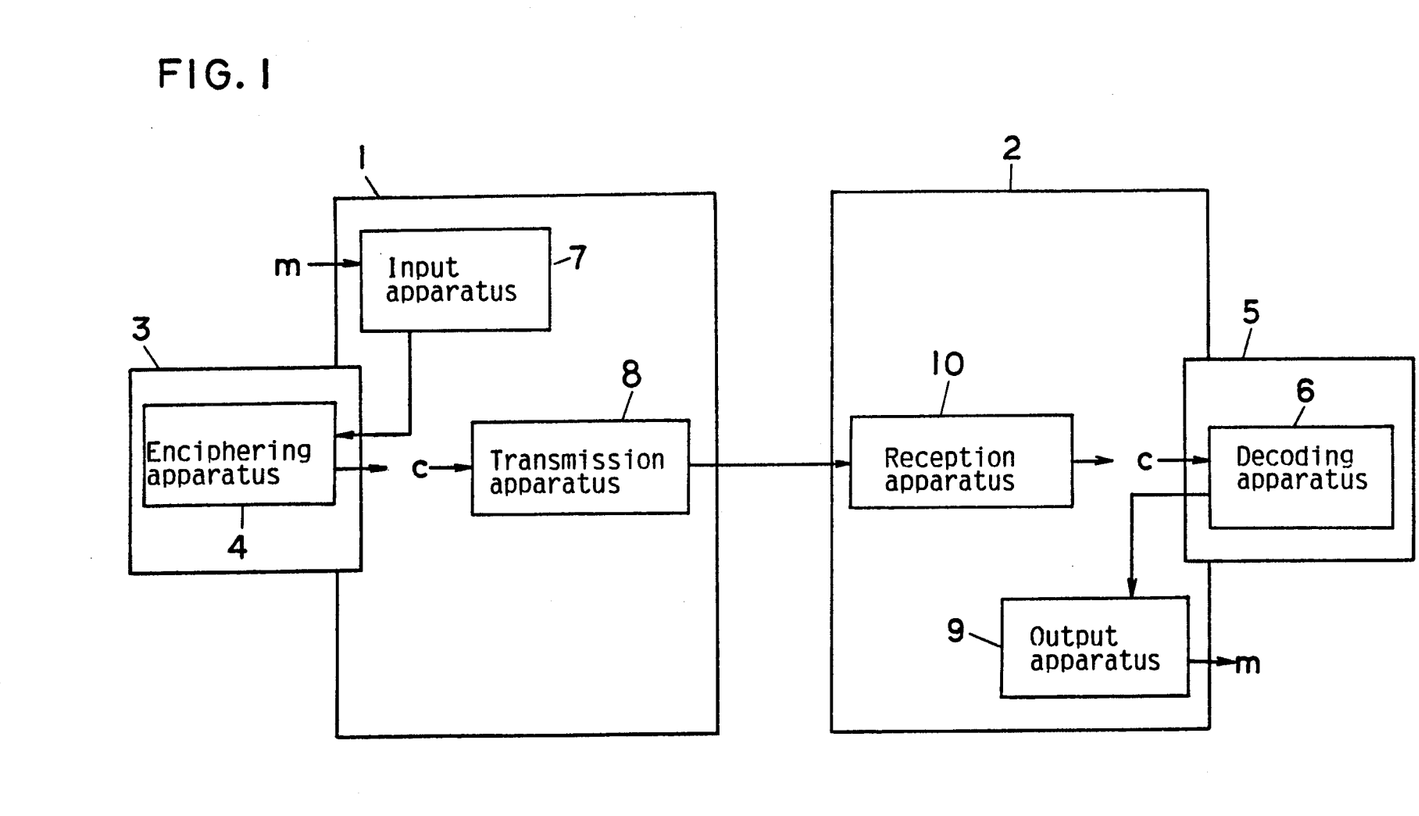
FIG. 1 is a figure of a system configuration of a system using an IC card of the present invention.

FIG. 1 is a block diagram showing an example of a data communication apparatus using an IC card which is used as an example of a data carrier of the present invention. Referring to FIG. 1, numeral 1 designates a first terminal, numeral 2 designates a second terminal, numeral 3 designates a first IC card having a cipher apparatus 4 in the same body, numeral 5 designates a second IC card having a decoding apparatus 6 in the same body. Moreover, the first terminal 1 comprises an input apparatus 7 and a transmission apparatus 8, and the second terminal 2 comprises an output apparatus 9 and a reception apparatus 10.

A process for carrying out cipher communication by this system is shown hereafter. First, in starting the cipher communication, a sending party inserts the first IC care 3 in the first terminal 1, and a receiving party inserts the second IC card 5 in the second terminal 2. After then, the sending party inputs a plain text m by using the input apparatus 7. The plain text m is inputted into the first IC card 3, and is converted into a cipher text c by the enciphering apparatus 4 and is output. The first terminal 1 outputs the cipher text c to the second terminal 2 by using the transmission apparatus 8. On the other hand, the receiving party receives the above-mentioned cipher text c by using the reception apparatus 10. The cipher text c is inputted to the second IC card 5, and is decoded to the plain text m by the decoding apparatus 6 and is output. The second terminal 2 outputs the restored plain text m by using the output apparatus 9. A system for carrying out the cipher communication by using the IC card for a cipher apparatus and a decoder in this manner is considered. In carrying out an actual cipher communication, common ownership of the session key is required, as mentioned above. As to this, elucidation is made with reference to the detailed figures of the IC card shown after FIG. 2. With respect to FIG. 2 and thereafter, the first terminal 1 and the second terminal 2 are omitted in the drawings.

Figure 2:
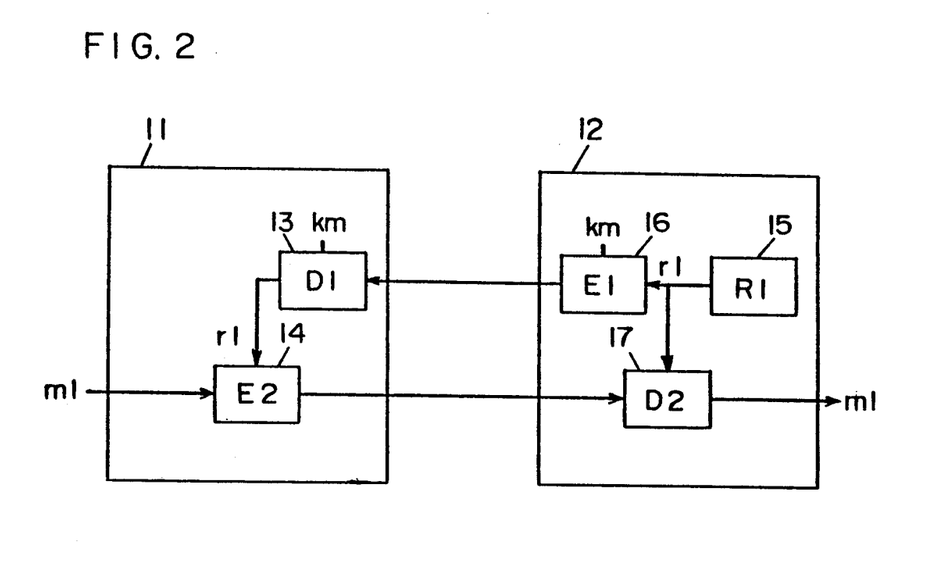
FIG. 2 is a block diagram showing the IC card having a key common ownership function in accordance with an embodiment of the present invention.

FIG. 2 is a block diagram of the IC card in accordance with an embodiment of the present invention. Referring to FIG. 2, numeral 11 designates the first IC card, and numeral 12 designates the second IC card. The first IC card 11 comprises first decoding means 13 and second enciphering means 14. Then, the second IC card 12 comprises random number generating means 15, first enciphering means 16 which is paired with the first decoding means 13, the second decoding means 17 which is paired with the second enciphering means 14.

Hereafter, the present embodiment is elucidated in compliance with FIG. 2. Since the second IC card 12 holds the key in common, the random number r1 which is output by the random number generating means 15 is enciphered by a master key km by using the first enciphering means 16 and is sent to the first IC card 11. By using the first decoding means 13, the first IC card 11 decodes the enciphered random number by the master key km and restore r1. Thereby, using this as the session key, the cipher communication of the plain text m1 can be carried out by the second enciphering means 14 and the second decoding means 17, since the first IC card 11 and the second IC card 12 hold the random number r1 in common. Therein, master key km is a common value to whole IC cards.

The reason that the key common ownership method shown in FIG. 2 is safe is elucidated hereafter. First, since the master key km is stored in the memory in the IC card which is physically safe, the master key km can not be read out even by the owner of the IC card. Therefore, even if the output of the first enciphering means 16 is tapped on the communication line, the random number r1 can not be decoded from the output of the first enciphering means 16 without using the IC card in which the master key km is stored. Consequently, the cipher text output from the second enciphering means 14 can not be deciphered.

Subsequently, the case in which there is three communication parties A, B, C which belong to the system are present, and the C intends to decipher the cipher text which is exchanged between the A and B is considered. Since the C is the communication party which belongs to the system, the C has the first IC card 11 or the second IC card 12. First, the assumption is made that the C has the first IC card 11. If the C taps the output of the first enciphering means 16 which is exchanged between the A and the B, and input it into the own IC card, restoration of the random number r1 in own IC card is possible by the first decoding means 13 and the master key km. However, the function that the IC card can perform by using the random number r1 is only for enciphering by the second enciphering means 14, and there is not decoding function. On the other hand, even if the C has the second IC card 12 having the second decoding means 17, the key in decoding of the IC card is the random number which is automatically generated by the IC card. Namely, the C can not make simultaneously arbitrary setting of the decoding key and decoding process using the key by using own IC card.

Figure 3:
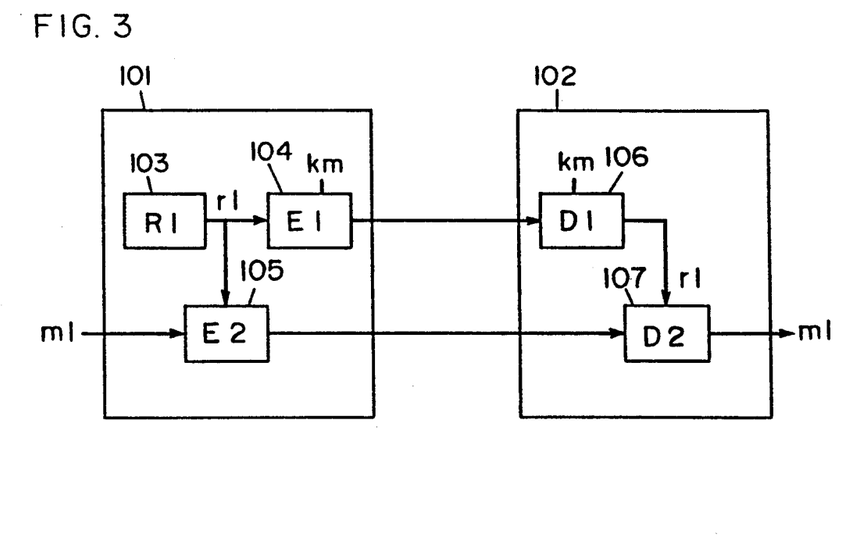
FIG. 3 and FIG. 10 are block diagrams of the IC cards which configurate a key common ownership system which is not safe.

This feature becomes more clear when compared with the method of common ownership of unsafe key shown in FIG. 3. Referring to FIG. 3, numeral 101 designates the first IC card, and numeral 102 designates the second IC card. The first IC card 101 comprises a random number generating means 103, a first enciphering means 104 and a second enciphering means 105. The second IC card 102 comprises a first decoding means 106 which is paired with the first enciphering means 104 and a second decoding means 107 which is paired with the second enciphering means 105. What is different from the embodiment of FIG. 2 is that the first IC card 101 for transmitting a plain text m1 generates the random number r1, and sent it to the second IC card 102. In other words, the second IC card 102 performs the decoding process by using the random number r1 as a key which is sent from other party. In this method, the third party having the second IC card 102 decodes the r1 in own IC card by tapping the pair of the output of the first enciphering means 104 and the output of the second enciphering means 105, and input them into own IC card, an thereby the cipher text with respect to the plain text m1 can be deciphered. As mentioned above by the method shown in FIG. 3, safe common ownership of the key can not be realized.

From the above-mentioned fact, by the configuration of the IC card shown in FIG. 2, the IC card which has generated the random number, namely only the second IC card 12 of the reception party is able to decode the cipher text, and it is understood that the cipher communication is safe. Moreover, if the IC card shown in FIG. 2 is used, common ownership of the key is easily realizable since both the list of the secret keys and the center are not required. Additionally, since it is composed of only the secret key cipher, high speed processing is possible.

Figure 4:
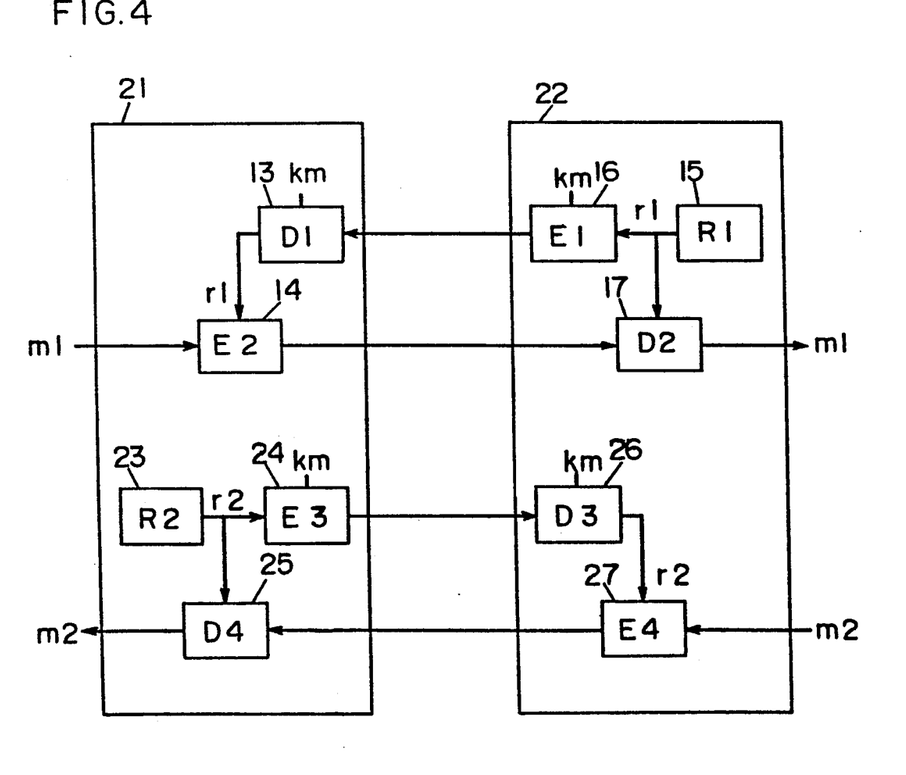
FIG. 4, FIG. 5, FIG. 6, FIG. 8 and FIG. 9 are block diagrams showing the IC cards having the key common ownership function in accordance with other embodiment of the present invention.

FIG. 2 shows the case of a single direction communication, but in the event that both-direction communication is carried out, the configuration as shown in FIG. 4 is preferable. Referring to FIG. 4, numeral 21 designates the first IC card, numeral 22 designates the second IC card, and numerals 13-17 are identical with those of FIG. 2, and the configuration are completely identical with FIG. 2. In order to communicate in inverse direction of the embodiment of FIG. 2, as other elements, the first IC card 21 comprises a second random number generating means 23, a third enciphering means 24, and a fourth decoding means 25. Moreover, the second IC card 22 comprises a third decoding means 26 which is paired with the third enciphering means 24, and a third enciphering means 27 which is paired with the fourth decoding means 25. The part which is composed of numerals 23-27 are symmetrical to the part which is composed of the numerals 13-17. Namely, when the second IC card 22 sent a plain text m2 to the first IC card 21, the first IC card 21 generates a random number r2 by using the second random number generating means 23, and it is enciphered by the third enciphering means 24 and is sent. The second IC card 22 decodes r2 which is enciphered by using the third decoding means 26 and r2 is obtained. After then, the first IC card 21 and the second IC card 22 perform the cipher communication of the plain text m2 by the fourth enciphering means 27 and the fourth decoding means 25 by using r2 as a session key.

Here, by using the same master key km that has been used when the random number r1 is enciphered as a key for enciphering and sensing the random number r2, furthermore by using the same one which is to be applied on the same calculation to the first enciphering means 16 and the third enciphering means 24 (in a similar manner with respect to the decoding means 13 and 26 which are paired with them), and by using the same one which is to be applied on the same calculation to the second enciphering means 14 and the fourth enciphering means 27 (in a similar manner with respect to the decoding means 17, 25 which are paired with them), the first IC card 21 and the second IC card 22 become the same configuration except for the first random number generating means 15 and the second random number generating means 23. Namely, the communication parties which belong to the system carry out the cipher communication of both directions with an arbitrary communication party which belongs to this system by having each one IC which has the same configuration. In this case, the first and the second random number generating means 15, 23 are preferable to output different random number series with respect to each IC card, but reference to this is minutely elucidated hereinafter.

Though each IC card comprises both the decoding means (13 or 26) for restoring the random number and the decoding means (25 or 17) for restoring the message, in a similar manner to the embodiment of FIG. 2, deciphering of the cipher text which is directed to other person is impossible, and safety of the cipher communication is maintained since an arbitrary establishment of the decoded key and decoding processing by using the key can not be carried out simultaneously by using own IC card.

Figure 5:
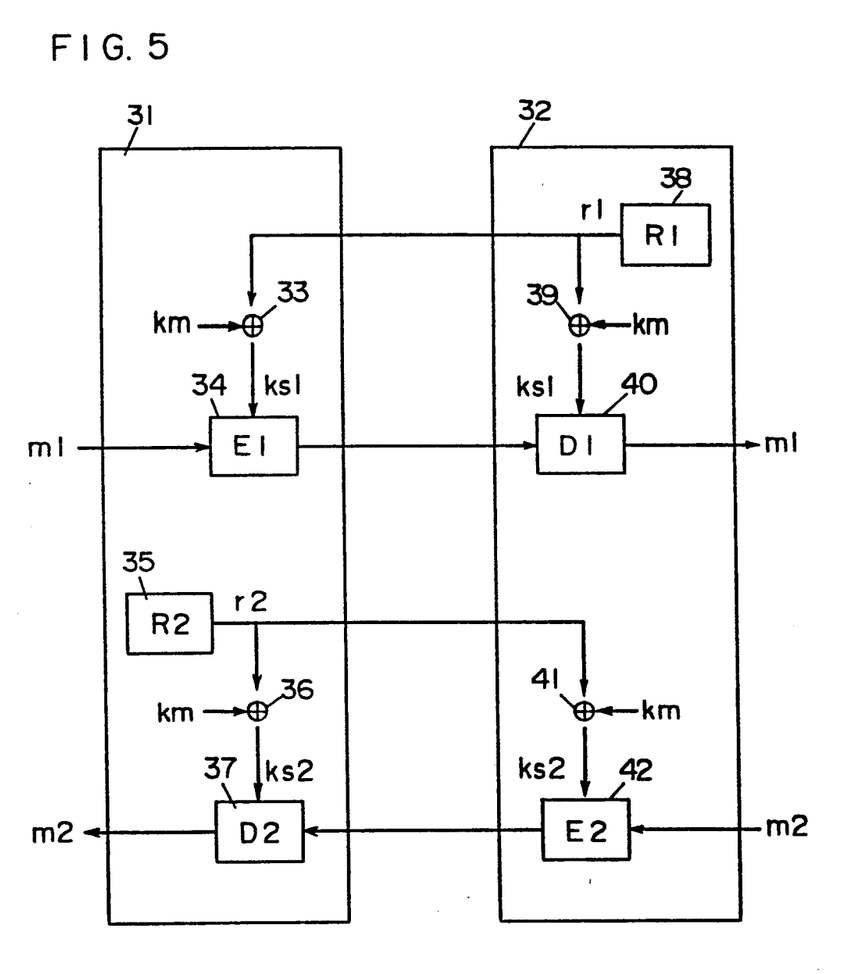

FIG. 5 is a block diagram showing other embodiment of the IC card of the present invention. Referring to FIG. 5, numeral 31 designates the first IC card, numeral 32 designates the second IC card. The first IC card 31 comprises a first exclusive logical sum calculation means 33, a first enciphering means 34, a second random number generating means 35, a second exclusive logical sum calculation means 36, and a second decoding means 37. And, the second IC card 32 comprises a first random number generating means 38, a third exclusive logical sum calculation means 39, a first decoding means 40 which is paired with the first enciphering means 34, a fourth exclusive logical sum calculation means 41, and a second enciphering means 42 which is paired with the second decoding means 37. Here, the first enciphering means 34 and the second enciphering means 42 perform the same calculation (it is the similar with respect to the decoding means 40, 37 which are paired with them). The present embodiment is identical with the embodiment of FIG. 4, and shows the case which performs bilateral communication, and the first IC card 31 and the second IC card 32 have entirely the same configuration except for the random number generating means 38, 35.

Hereafter, according to FIG. 5, operation of the present embodiment is elucidated. First, the case in that the first IC card 31 sends a plain text m1 to the second IC card 32 is elucidated. The second IC card 32 sends the random number r1 which is generated by the first random number generating means 38 to the first IC card 31. The first IC card 31 and the second IC card 32 perform exclusive logical sum calculation of the random number r1 and the master key km by using a first exclusive logical sum calculation means 33 and the third exclusive logical sum calculation means 39, respectively, and a session key ks1 is obtained. The master key km is common to the whole IC cards. Hereafter, the first IC card 31 and the second IC card 32 carry out cipher communication of the plain text m1 by using the session key which is common to both the parties. In the case where the second IC card 32 sends a plain text m2 to the first IC card 31 is also carried out in the same manner by generation of a random number r2 by the first IC card 31 using the second random number generating means 35.

Safety of the embodiment, similarly with the embodiment of FIG. 2 and FIG. 4, is assured by that arbitrary setting of the decoding by using own IC card and the decoding processing by using the key can not be carried out simultaneously.

Figure 6:
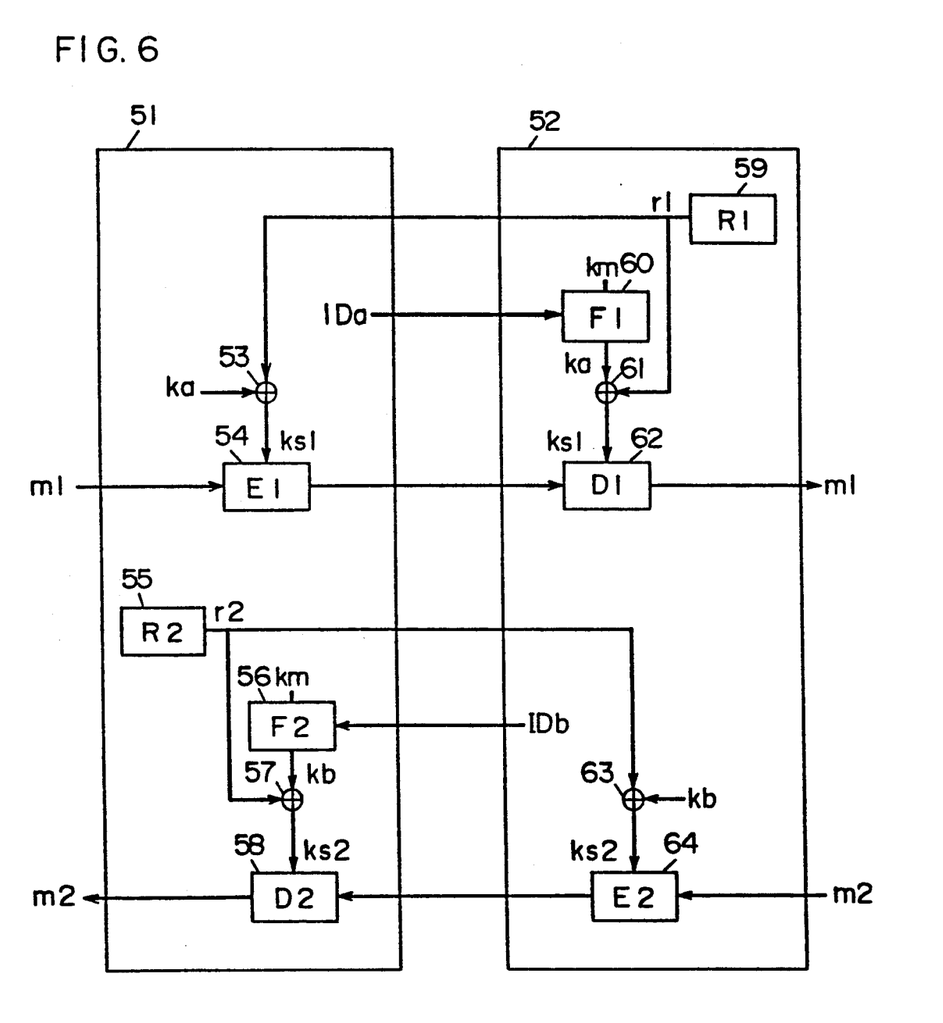

However, in the above-mentioned example, since the whole communicating parties which belong to the system have the card of the same configuration, pretending as other person is possible. An example of an IC card which is added with a function for certifying such other person in order to prevent this, is shown in FIG. 6. Referring to FIG. 6, numeral 51 designates the first IC card, and numeral 52 designates the second IC card. The first IC card 51 comprises first exclusive logical sum calculation means 52, a first enciphering means 54, a second random number generating means 55, a second key generating means 56, a second exclusive logical sum calculation means 57 and a second decoding means 58. Moreover, the second IC card 52 comprises a first random number generating means 59, a first key generating means 60, a third exclusive logical sum calculation means 61, a first encoding means 62 which is paired with the first enciphering means 54, a fourth exclusive logical sum calculation means 63, and a second enciphering means 64 which is paired with the second decoding means 58. Where, the first enciphering means 54 and the second enciphering means 64 perform the same calculation (the decoding means 62, 58 which are paired with them are identically performed). Additionally, the first key generating means 60 and the second key generating means 56 perform the same calculation. In a manner similar to the embodiment of FIG. 4 and FIG. 5, though the present embodiment shows the case performing both directions communication, the first IC card 51 and the second IC card 52 have card identifying information (IDa, IDb) and secret keys (Ka, Kb) which are different from each card, respectively.

Hereafter, operation of the present embodiment is elucidated in compliance with FIG. 6. First, the case in which the first IC card 51 sends a plain text m1 to the second IC card 52 is elucidated. The second IC card 52 sends the random number r1 which is generated by the first random number generating means 59 to the first IC card 51. On the other hand, the first IC card 51 sends own card identifying information IDa to the second IC card 52. The second IC card 52 performs calculation by using the card identifying information IDa which is sent from the other party and the master key km as parameters. Here, relation between the card identifying information and the secret key of whole IC cards is set in each IC card at the time of publication so as to satisfy that Secret key $= F$ (card identifying information, km)

F: Function of key generating means
km: a master key which is common to whole IC card.

Consequently, the result of the above-mentioned calculation is $$ka = F(IDa, km), \text{ and}$$

thus, the secret key of the first IC card 51 is generated in the second IC card 52. Subsequently, the first IC card 51 and the second IC card 52 carry out exclusive logical sum calculation of the random number r1 and the secret key ka by using the first exclusive logical sum calculation means 53 and the third exclusive logical sum calculation means 61, respectively, and the session key ks1 is obtained. After then, the first IC card 51 and the second IC card 52 carry out cipher communication of a plain text m1 by using the session key ks1 which is common to both parties. The case that the second IC card 52 sends a plain text m2 to the first IC card 51 can be performed in the same manner by that the first IC card 51 generates the random number r2 by using the second random number generating means 55 and the second IC card 52 sends own card identifying information IDb to the second IC card 51.

Safety of the present embodiment is assured in a manner similar to the above-mentioned embodiments, because an arbitrary setting of the decoding key by using one's own IC card and decoding processing by using the key can not be simultaneously carried out. Further, in the present embodiment, even if an evil-minded third party pretends as the owner of the first IC card 51 and sends IDa to the second IC card 52, a message making sense can not be sent by enciphering, since only the first IC card 51 has the secret key ka, for example, Therefore, fraud due to "pretending" can be easily seen through by a suitable protocol.

Safety of the embodiments hitherto described mainly depends on the structure of the random number generating means. Namely, if the random number which is generated by own IC card can be manipulated, or the random number system can be predicted, the evil-mined person is capable of deciphering the tapped cipher text by using own IC card. For example, if the random number generating means has a structure bringing the input from the outside into a parameter, a necessary random number can be generated in own IC card. Moreover, if the random number system is common to whole IC cards, the random number which is automatically generated in the inside of own IC card can be anticipated by investigating the random number system of an IC card. On the basis of this aspect, a safe random number generating means which is impossible to be manipulated from the outside and generates a random number system which is different from each IC card is shown in FIG. 7.

Figure 7:
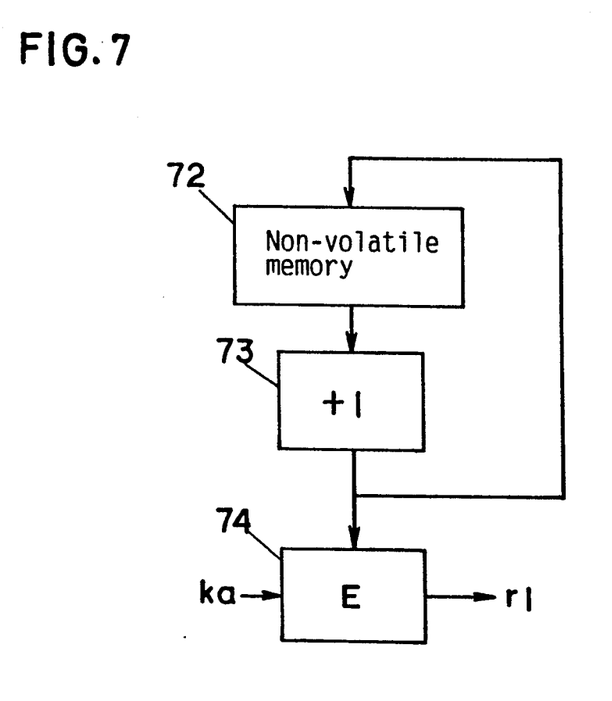
FIG. 7 is a block diagram showing random number generating means in accordance with an embodiment of the present invention.

FIG. 7 is a block diagram of the random number generating means, and numeral 72 designates a non-volatile memory which is capable of electric rewriting, numeral 73 designates an adder, and numeral 74 designates enciphering means. The non-volatile memory 72 stores data of 64 bits, for example. The adder 73 adds 1 to 64 bits data which is stored in the non-volatile memory 72, and omits the overflow part and generates the 64 bits data. The 64 bits data is inputted to the enciphering means 74, simultaneously is fed back to input for the subsequent calculation by the adder 73, and is stored in the non-volatile memory 72. The enciphering means 74 enciphers the 64 bit data which is output from the adder 73 by the key which is peculiar to each IC card and outputs. As the key which is peculiar to each IC card, for example the secret keys ka, Kb shown in the embodiment of FIG. 6 are usable.

Here, if the output of the adder 73 has a long period, the output value of the enciphering means 74 becomes an enough random value. Moreover, since an output from the outside is not used at all, even the owner of the IC card can not manipulate the output of the random number generating means. Furthermore, the key of the enciphering means 74 is a peculiar value to each IC card, and hence even if the random number generating means of whole IC cards has the same configuration, the output random number system is different from each IC card.

Figure 8:
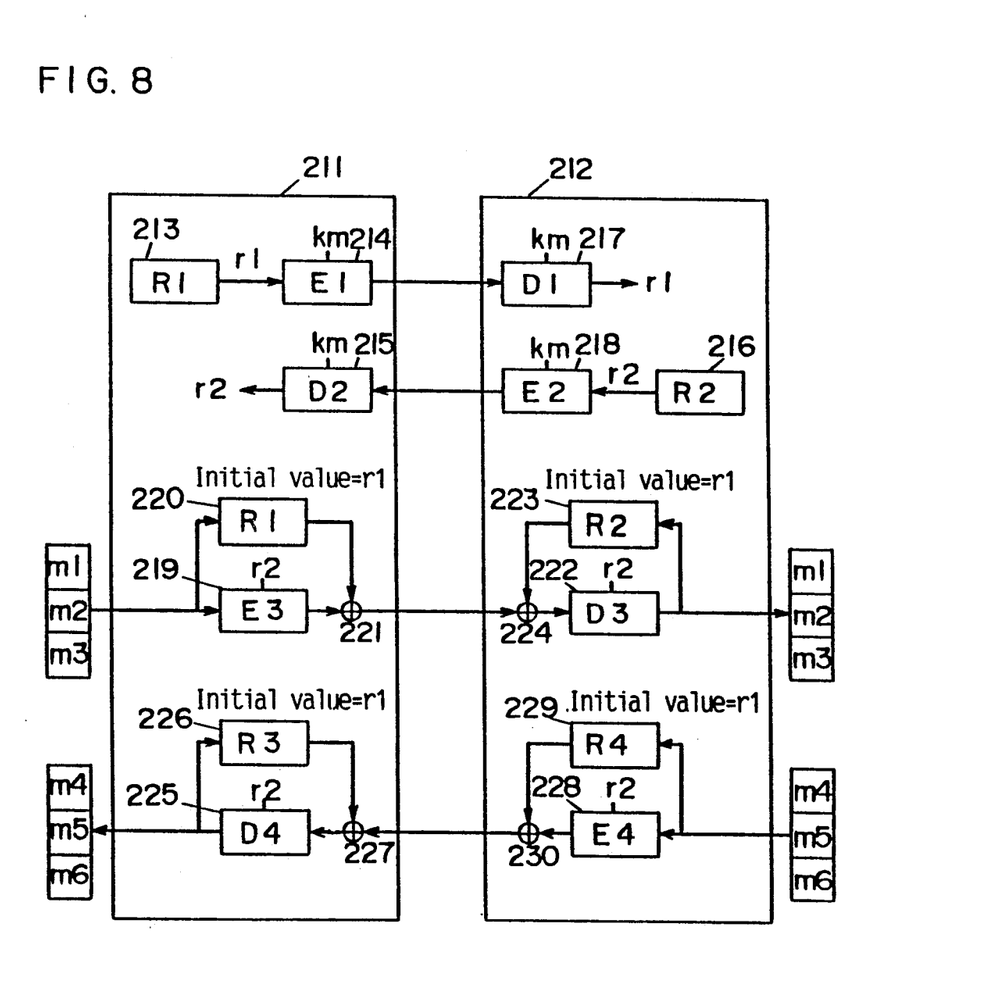

FIG. 8 is a block diagram of an IC card in accordance with other embodiment of the present invention. Referring to FIG. 8, numeral 211 designates a first IC card, and numeral 212 designates a second IC card, and in order to hold a common key and the like, the first IC card 211 comprises a first random number generating means 213, a first enciphering means 214 and a second decoding means 215, and the second IC card 212 comprises a second random number generating means 216, a first decoding means 217 which is paired with the first enciphering means 214, and a second enciphering means 218 which is paired with the second encoding means 215. And, in order to send a message from the first IC card 211, the first IC card 211 comprises a third enciphering means 219, a first register 220 and a first exclusive logical sum calculation means 221. Moreover the second IC card 212 comprises a third decoding means 222 which is paired with the third enciphering means 219, a second register 223 and a second exclusive logical sum calculation means 224. Furthermore, in order to send a message from the second IC card 212, the first IC card 211 comprises a fourth decoding means 225, a third register 226 and a third exclusive logical sum calculation means 227. Furthermore, the second IC card 212 comprises a fourth enciphering means 227 which is paired with the fourth decoding means 225 and a fourth register 229 and a fourth exclusive logical sum calculation means 230.

Hereafter, operation of the present embodiment is elucidated, in compliance with FIG. 8. First, the first IC card 211 enciphers the first random number r1 output from the first random number generating means 213 by a master key km by using the first enciphering means 214 and sent to the second IC card 212. The second IC card 212 decodes the enciphered random number by the master key km and restores the first random number r1 by using the first decoding means 217. Moreover, the second IC card 212 enciphers the second random number r2 output from the second random number generating means 216 by the master key km by using the second enciphering means 218 and sends to the first IC card 211. The first IC card 211 decodes the enciphered random number by the master key km and restores the second random number r2 by using the second decoding means 215. By the process as has above-mentioned, the first IC card 211 and the second IC card 212 result in holding two common secret random numbers r1, r2 in common.

Subsequently, a method for sending a message from the first IC card 211 to the second IC card 212 by using r1, r2 which are held in common is elucidated. In the following elucidation, a sing "+" means exclusive logical sum calculation. First, at start of the cipher communication, as an initial state, the first random number r1 is stored in the first and second registers 220, 223. The first IC card 211 divides the message of the plain text to be sent into respective ciphering units. Plural blocks which are obtained as mentioned above, are named as m1, m2, m3. The third enciphering means 219 applies a ciphering process to the head block m1 by using the second random number r2 as a key, and as a result c1=E3r2(m1) is output to the first exclusive logical sum calculation means 221. Here, E3 shows a cipher function of the third ciphering means 219. The first exclusive logical sum calculation means 221 calculates an exclusive logical sum of the input c1 from the enciphering means 219 and the data (initial value r1) in the first register 220, and sends the result c1+r1 to the second IC card 212.

On the other hand, in the following manner, the second IC card 212 restores the plain text m1 from received at a (cipher text) c1+r1. The second IC card 212 calculates an exclusive logical sum of the above-mentioned data c1+r1 which is sent and the data (initial value r1) in the second register 223, and as a result (c1+r1)+r1=c1 is output to the third decoding means 222. The decoding means 222 applies the decoding process to the above-mentioned data c1=E3r2(m1) which is sent by using the second random number r2 as a key, and restore the result m1. Thereafter, the first IC card 211 stores the plain text m1 in the first register 220 as a replacement for the initial value r1, on the one hand, the second IC card 212 stores the restored plain text m1 in the second register 223 as a replacement for the initial value r1. Therefore, the first IC card 211 and the second IC card 212 hold in common the r1 and r2, and as far as the data in communication is not varied accidentally or with intention, the same value is always stored in the first register 220 and the second register 223. All the plain text can be restored by repeating the above-mentioned same process of the head block m1 to m2, m3.

In the event that the plain text m4, m5, m6 are sent from the second IC card 212, the cipher communication can be carried out in a similar manner by using the fourth decoding means 226, the third register 226, the third exclusive logical sum calculation means 227, the fourth enciphering means 228, the fourth register 229 and the fourth exclusive logical sum calculation means 230. The data value at each important point in this case is shown in the following Table 1. The sing "+" in the Table 1 shows exclusive logical sum calculation.

TABLE 1

| The case of transmission of a message from the second IC card in FIG. 8 | | | | |
|---|---|---|---|---|
| Second IC card 212 | | | First IC card 211 | |
| Normal sentence | Fourth register | Sending and receiving data | Third register | Restored sentence |
| m4 | r1 | E4r2 (m4) + r1 | r1 | m4 |
| m5 | m4 | E4r2 (m5) + m4 | m4 | m5 |
| m6 | m5 | E4R2 (m6) + m5 | m5 | m6 |

The reason why the present embodiment is safe is elucidated hereafter. First, since the master key km is stored in the memory in the IC card which is physically safe, even the owner of the IC card can not read out the master key km. Therefore, even if the output of the first enciphering means 214 and the output of the second enciphering means 218 are tapped on the communication line, the first random number r1 and the second random number r2 can not be restored without using the IC card in which the master key km is stored. Consequently, deciphering of the cipher text is impossible.

Subsequently, a case is considered that there are three communication parties A, B, C which belong to this system and C intends to decipher the cipher text which is exchanged between A and B. Since C is the communicating party which belongs to this system, C has the first IC card 211 or the second IC card 212. First, it is assumed that C has the second IC card 212, and intends to decipher the cipher text from the first IC card 211. In this case, even if C taps the cipher text which is sent from the first IC card 211 (namely, the output of the first exclusive logical sum calculation means 211) and inputs it to his own IC card, the tapped cipher text can not be decoded correctly since the decoding key of the third decoding means 222 is not the second random number r2 but a random number which is automatically generated in the IC card in that time.

Subsequently, it is assumed that C has the first IC card 211, and intends to decipher the cipher text from the second IC card 212. In this case, the second random number r2, namely the decoding key of the fourth decoding means 225 can be generated in his own IC card by the second decoding means 215 and the master key km, by that C taps the output of the second enciphering means 218 which is exchanged between A and B (namely, enciphered second random number), and input ti to his own IC card. However, in this time, the IC card of C can not correctly decode the cipher text from the second IC card 212, since the IC card automatically generates a random number inside by the first random number generating means 213 (this random number is r3), and bring it to an initial value of the third register 226. The state is shown in the following Table 2. From Table 2, first, it is understood that the m1 is not correctly decoded, since $r1 \neq r3$. Since m1 which is not correctly decoded is fed back to the third register 226, successive m2 is not also correctly decoded. In this way, influence of $r1 \neq r3$ is given to all successive data thereto, and deciphering of the cipher text which is output from the second IC card 212 become completely possible.

TABLE 2

| The case that the initial value of the register differs in FIG. 8 | | | | |
|---|---|---|---|---|
| Second IC card 212 | | | First IC card 211 | |
| Normal sentence | Fourth register | Sending and receiving data | Third register | Restored sentence |
| m4 | r1 | E4r2 (m4) + r1 | $\neq$r1 | $\neq$m4 |
| m5 | m4 | E4r2 (m5) + m4 | $\neq$m4 | $\neq$m5 |
| m6 | m5 | E4r2 (m6) + m5 | $\neq$m5 | $\neq$m6 |

Figure 9:
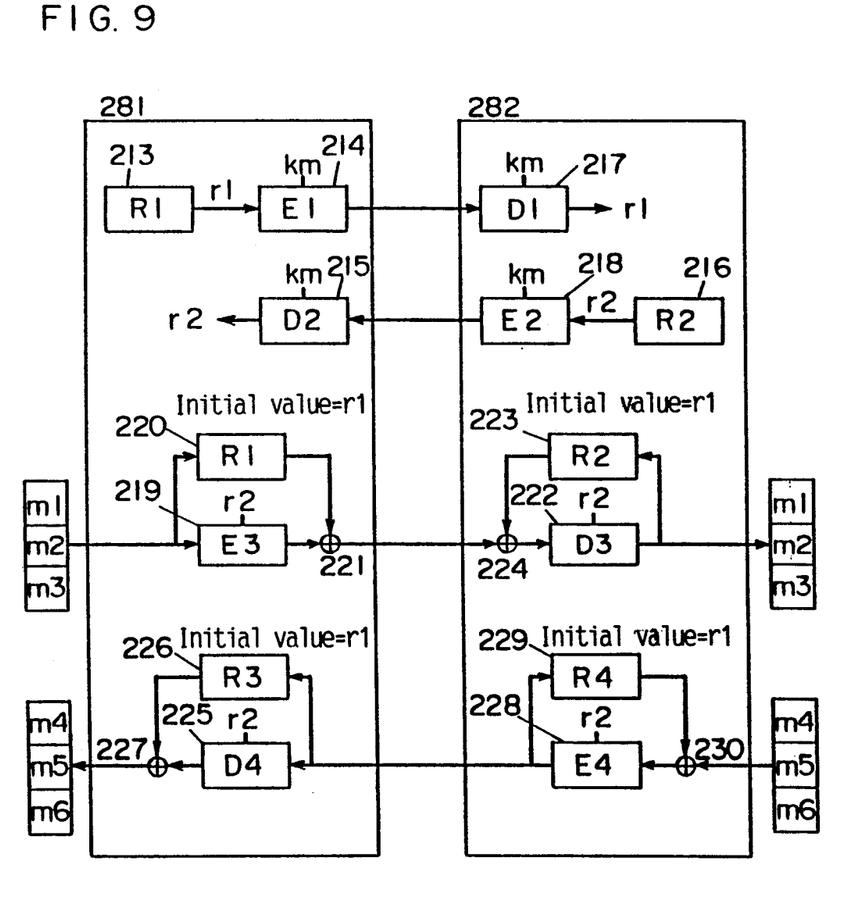

The feature of the present invention is further clarified by comparison with the unsafe cipher communication system shown in FIG. 9. FIG. 9 shows a block diagram of an IC card which performs unsafe cipher communication, and numeral 281 designates a first IC card, numeral 282 designates a second IC card. All structural elements and the configuration of 213-224 are completely identical with FIG. 8, but as to 225-230, the point that the second IC card 212 has a feed-back function and the first IC card 211 has a feed-forward function, is inverted to the case of FIG. 8.

In this configuration, the case in which the third party C having the first IC card 281 attempts to decipher the cipher text which is output from the second IC card 282 is considered. As mentioned above, C can generate the second random number r2 by tapping the output of the second enciphering means 218 and by inputting it in his own IC card. At the same time, the IC card of C automatically generates the random number r3 which is different from the first random number r1. By using r2 as the decoding key, and by using r3 as an initial value of the third register 226, the data value of each important point in the case which attempts to decipher the cipher text from the second IC card 282 is shown in the following Table 3. As is understood from the Table 3, although the head block is just impossible to be deciphered, the influence does not affect after then since the receiving side has no feed-back function, and deciphering is made possible after the second block. In the system shown in FIG. 9 as this way, safe cipher communication is not realized.

TABLE 3

| The case in which the initial value of the register differs in FIG. 9 | | | | |
|---|---|---|---|---|
| Second IC card 282 | | | First IC card 281 | |
| Normal sentence | Fourth register | Sending and receiving data | Third register | Restored sentence |
| m4 | r1 | c4 = E4r2 (m4 + r1) | $\neq$r1 | $\neq$m4 |
| m5 | c4 | c5 = E4r2 (m5 + c4) | c4 | m5 |
| m6 | c5 | c6 = E4r2 (m6 + c5) | c5 | m6 |

As is understood from the above, by the configuration of the IC card shown in FIG. 8, the IC card which can have both the first random number r1 and the second random number r2, namely only the IC card of the party concerned which performs cipher communication is made possible to decipher the cipher text, and the cipher communication is secured. And, by using the IC card shown in FIG. 8, common ownership of the key is easily realized since both the list of the secret keys and the center are not necessary. Moreover, since it can be structured by only the secret key cipher, high speed processing is realizable.

And, the first IC card 211 and the second IC card 212 becomes completely the same configuration except for the first random number generating means 213 and the second random number generating means 216, by using one for applying the same calculation to the first enciphering means 214 and the second enciphering means 218 (which is identical with respect to the decoding means 217, 215 which are paired with them), and furthermore by using one for applying the same calculation to the third deciphering means 219 and the fourth enciphering means 228 (which is identical with respect to the decoding means 222, 225 which are paired with them). Namely, the communication parties which belong to this system can do bilateral directions cipher communication with an arbitrary communication party which belongs to this system by respectively having one IC card of the same structure. In this case, the random number generating means 213, 216 are preferable to output a random number system which differs from each IC card.

Figure 10:
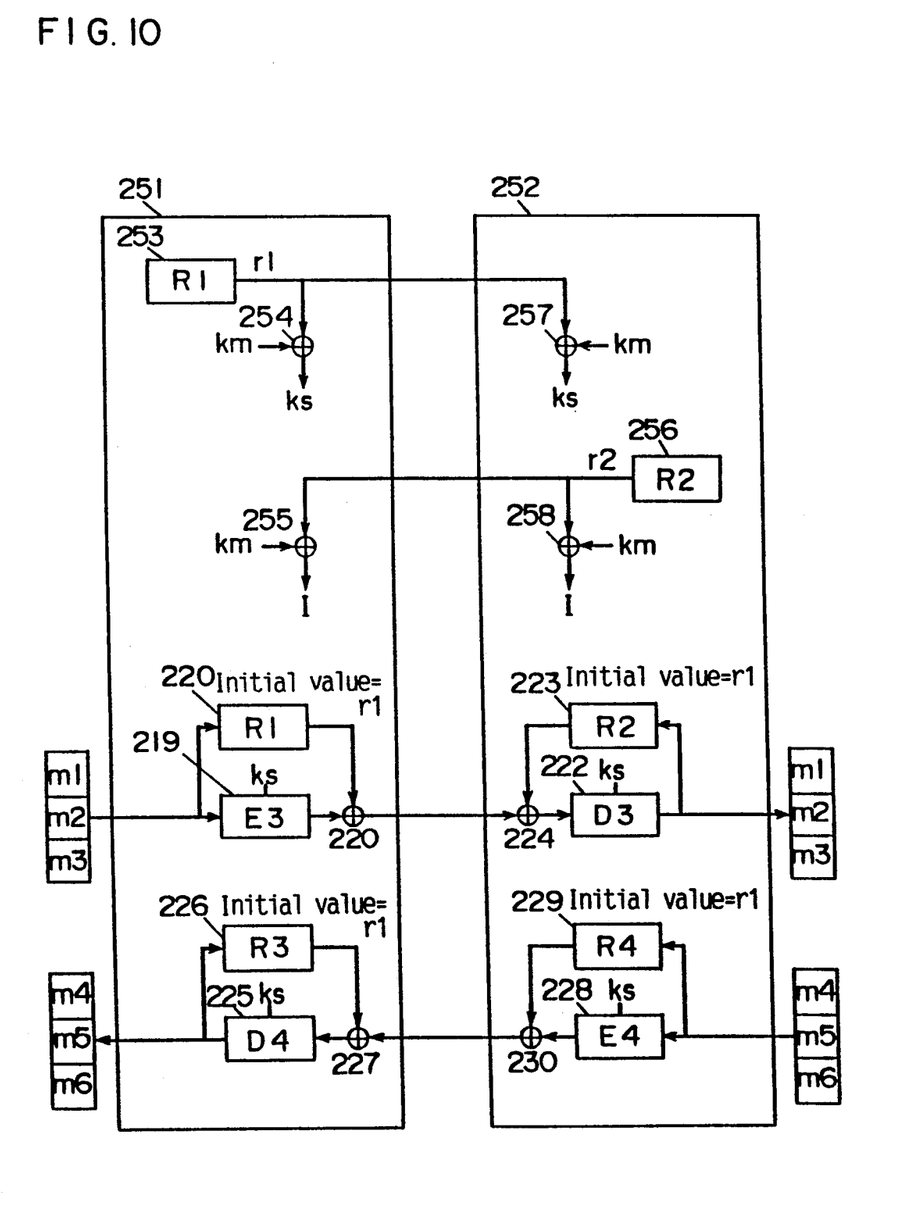

FIG. 10 is a block diagram of the IC card with an enciphering processing function in accordance with other embodiment of the present invention. Referring to FIG. 10, numeral 251 designates a first IC card, numeral 252 designates a second IC card; and the first IC card 251 comprises a first random number generating means 253, a fifth exclusive logical sum calculation means 254, a sixth exclusive logical sum calculation means 225 for holding in common a key and an initial value of a register; and the second IC card 252 comprises a second random number generating means 256, a seventh exclusive logical sum calculation means 257 and a eighth exclusive logical sum calculation means 258. The structural elements 219–230 for performing cipher communication of a message and the configuration are completely identical with the embodiment of FIG. 8.

Hereinafter, in compliance with FIG. 10, operation of the present embodiment is elucidated. The first IC card 251 sends the first random number r1 which is generated by the first random number generating means 253 to the second IC card 252, in order to hold in common the key and the initial value of the register. The first IC card 251 and the second IC card 252 perform exclusive logical sum calculation of the random number r1 and the master key km by using the fifth exclusive logical sum calculation means 254 and the seventh exclusive logical sum calculation means 257, respectively, and a common key ks is obtained. In the similar manner, a common initial value I is obtained in the registers 220, 223, 226 and 229 by using the second random number generating means 256 and the sixth exclusive logical sum calculation means 255 and the eighth exclusive logical sum calculation means 258. The method of cipher communication thereafter and safety of the present embodiment are completely identical with the embodiment of FIG. 8 and thus the elucidation is omitted.

INDUSTRIAL APPLICABILITY

As mentioned above, according to the present invention, common ownership of a key for cipher communication is safely, easily and speedily realizable by storing a secret key in an IC card which is physically safe and generating a decoding key from a random number of which the IC card of a reception party automatically output and generating an enciphering key from the random number which is sent from the reception party. Moreover, in comparison with the conventional key common ownership system using the secret key cipher, the present invention has a very useful feature in practical use by which common ownership of the key is realizable without requiring both the list of the secret keys and a key distribution (or translation) center. Moreover, since it is realizable with only the secret key cipher, it is superior in the aspect of a processing speed which is required for ciphering and decoding to the method of the conventional cipher communication using a public key cipher.

Furthermore, by making that all IC cards which are used in one system are made by the same configuration except for a card identifying information and the secrete key which are peculiar to each IC card, in the aspect of operation, bilateral directions communication is realizable with an arbitrary communication party which belongs to the system; and on the other hand in the aspect of fabrication, mass-production of the IC card is made possible, and the effect in its practical use is very large.

We claim:

1. A data communication apparatus having a first terminal and a second terminal, wherein:
   said first terminal has
   a) input means for inputting plaintext information;
      b) a first data carrier for receiving said plaintext information and for providing an output, said first data carrier including enciphering means for enciphering said plaintext information;
   c) first terminal transmitting means for transmitting said output of said data carrier to said second terminal as enciphered data and for transmitting first data carrier identifying information to said second terminal; and
   d) first terminal receiving means for receiving enciphering operation-data from said second terminal;
   said second terminal has
   a) second terminal receiving means for receiving said transmitted output from said transmitting means;
   b) a second data carrier for deciphering the enciphered data and for providing an output, said second data carrier including deciphering means for deciphering the enciphered data; and
   c) second terminal transmitting means for transmitting enciphering operation-data to said first terminal;
   said deciphering means comprises
   a) means for generating said enciphering operation-data;
   b) master key storage means for storing a master key; a master key stored in said master key storage means;
   c) key generating means for generating a deciphering secret key based on said first data carrier identifying information transmitted to said second terminal and on said master key;
   d) first calculation means for generating a deciphering session key based on said deciphering secret key and said enciphering operation-data; and
   e) ciphertext processing means for deciphering said enciphered data based on said deciphering session key; and
   said enciphering means comprises
   a) first data carrier identifying information storage means for storing first data carrier identifying information;
   b) first data carrier identifying information stored in said first data carrier identifying information storage means;
   c) enciphering secret key storage means for storing an enciphering secret key;
   d) an enciphering secret key stored in said enciphering secret key storage means;
   e) second calculation means for generating an enciphering session key based on said enciphering operation data transmitted to said first terminal and on said enciphering secret key;
   f) plaintext processing means for enciphering said plaintext information using said session key.

* * * * *